United States Patent [19]
Smoot et al.

[11] Patent Number: 5,057,815
[45] Date of Patent: Oct. 15, 1991

[54] COMBAT VEHICLE LIGHT SIGNALING SYSTEM

[75] Inventors: Wayne A. Smoot, Woodbridge, Va.; Bruce E. Amrein, Bel Air, Md.; Curtis L. McCoy, Aberdeen Proving Ground; Robert C. Brucksch, Street, both of Md.

[73] Assignee: The United States of America as represented by the Secretary of the Army, Washington, D.C.

[21] Appl. No.: 510,633

[22] Filed: Apr. 18, 1990

[51] Int. Cl.$^5$ .............................................. B60Q 1/26
[52] U.S. Cl. ................................... 340/468; 340/463; 340/469; 362/61; 362/80
[58] Field of Search ............... 340/468, 469, 471, 463, 340/464, 472; 434/11; 362/61, 80

[56] References Cited

U.S. PATENT DOCUMENTS

| | | | |
|---|---|---|---|
| 2,678,978 | 5/1954 | Reynolds | 340/464 X |
| 3,622,979 | 11/1971 | Dickerson | 340/473 |
| 3,678,457 | 7/1972 | Lev | 340/470 X |
| 4,299,575 | 11/1981 | Carrow et al. | 362/61 X |

Primary Examiner—Joseph A. Orsino
Assistant Examiner—Jeffery A. Hofsass
Attorney, Agent, or Firm—Milton W. Lee; Anthony T. Lane

[57] ABSTRACT

A military range safety light signaling system used on combat vehicles of the type having a freely rotatable gun turret. The signaling system is comprised of a vertical column of lights, preferably three lights from top to bottom of red, amber, and green in a regular traffic light pattern and a rotating flashing light mounted on the left rear of the gun turret. The rotating flashing light is preferably an interchangable infrared beacon mounted high above the turret for use in live fire exercise or an amber light for use in highway movement of the combat vehicle. An operator inside the combat vehicle may selectively switch on any combination of the vertical column of lights and the rotating flashing light to represent the operating status of the vehicle weapons system and its movement.

7 Claims, 4 Drawing Sheets 5,057,815

COMBAT VEHICLE LIGHT SIGNALING SYSTEM

The invention described herein may be manufactured, used, and licensed by the U.S. Government for governmental purposes without the payment of any royalties thereon.

BACKGROUND OF INVENTION

1. Field

The present invention is in the field of means to identify the mode of operation of a combat vehicle, and relates to a light system with multiple identifying lights mounted on the rear exterior of a gun turret and in which the lights are selectively controllable from the interior.

2. Prior Art

In the past, little or no means for positively distinguishing occupied combat vehicles from unmanned heated target practice vehicles have been used during live fire target practice. One of the coinventors of the present invention, Wayne A. Smoot, filed a patent application Ser. No. 359,601, now Sir. No. H820, titled "Infrared Safety Beacon" on Jun. 1, 1989 discloses a rotatable infrared beacon which forms a part of the present multipurpose combat vehicle light signaling system.

Previously, colored flags or flashlights with colored lenses have been used to indicate the status of the vehicles weapon systems and any movements.

SUMMARY OF THE INVENTION

The present combat vehicle light signaling system provides a reliable firing range safety signaling system for use either on the firing ranges or in active combat and in movement of the combat vehicle over highways when not in firing mode. The signaling system is comprised of a plurality of different color lights in a vertical column attached on a gun turret of a combat vehicle opposite the direction of the guns, i.e. on the rear side of the freely rotatable turret, and preferably on the left rear side as a standard placement of the lights. Each of the plurality of lights may be selectively illuminated by an operator inside the vehicle activating a light control means, comprised of an interior control box for switching power to the lights from an internal power source. The present light signaling system is further comprised of a rotatable light means along with the vertical column of lights which are fixed to the left rear of the turret. The rotatable light means is preferably interchangeable rotatable warning lights comprised of an elevated infrared beacon for use in live fire practice only and an amber light for use in road marches only. The operator, who may be the vehicle commander or loader, may also selectively activate one of said rotatable warning lights if a rotatable warning light is attached to the combat vehicle turret at the time. The plurality of different color lights are preferably red, amber, and green top to bottom in the same pattern as a regular traffic light. The lights may each be one inch in diameter and one inch apart. These vertical column of lights form a part of an exterior light box. The exterior light box is in turn attached to a 90° L-shaped adapter bracket, preferably made of steel. The adapter bracket has a turret mounting plate on the short end of the L-shape and a light mounting plate on the long end of the L-shape. The adapter bracket has a gusset plate, preferably welded to both plates across where the plates join, to add strength to the adapter bracket. Each of the plates are preferably flat as they face each other, but are not intended to be limited to that particular shape. The light mounting plate has an offset flange on the outermost end thereof for attachment of either of the interchangable warning lights one at a time thereto by a quick attachment means, such as two or three bolts. The overall length of the light mounting plate is preferably about 13½ inches with the offset flange covering the last six inches thereof and is two inches wider than the light mounting plate, i.e. a total of 4¾ inches wide. The light mounting plate is preferably 2¾ inches wide up to the 4¾ inch wide offset flange, and is ¼ inch thick. The turret mounting plate is preferably ¼ inch thick and 2¾ inch wide and a little shorter than the light mounting plate and includes a circular flange at its outermost end which is ½ inch thick. The mounting plate flange may be bolted down under an antenna matching unit mounting flange at the rear of the turret. The mounting plate flange is open in the center and has mounting holes around its circumference through which the antenna matching unit bolts may go through to firmly lock the adapter bracket to the antenna matching unit. The turret matching plate circular flange has an opening through its circumference through which the power cable from the interior control box to the exterior light box passes.

It should be noted that the power cable also carries electrical leads for the rotatable warning lights and their motor drive means. It is to be understood that the rotatable light is preferably stationary and a surrounding housing with openings therein may be rotated to provide a thermal chopper as in the above noted patent application Ser. No. 359,601 or a reflectors inside a lens with the amber light may be rotated around the amber light. The vertical column of lights may be viewed through a viewing angle of more than 180°. The rotatable infrared beacon or the rotatable amber light are visible through the entire 360°. In fact, the infrared beacon is mounted on top of a long hollow tube to be well elevated above the vertical column of lights and the thermal mass of the combat vehicle. The flashing thermal beacon is used to prevent the combat vehicle from being mistakenly fired on as a possible practice target. The amber light is used to warn other traffic while the vehicle is on a road march.

The invention will be better understood by reference to the detailed description when considered in conjunction with the drawings.

DETAILED DESCRIPTION OF THE PREFERRED EMBODIMENT

Figure 1:
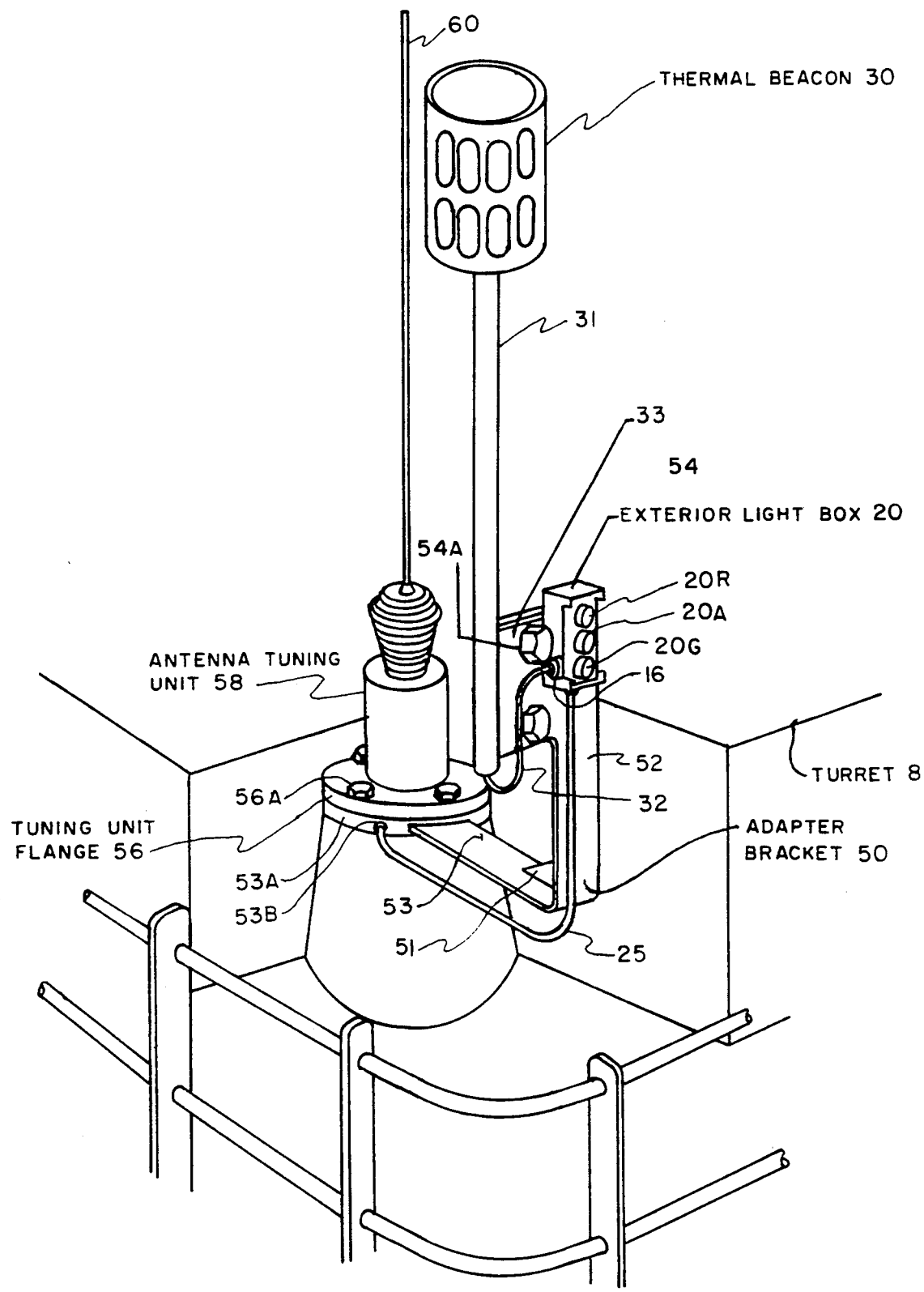
FIG. 1 illustrates a perspective view of the present exterior lighting system including the elevated thermal beacon.

Refer now to the drawing figures as appropriate for details of the present light signaling system used on a combat vehicle to indicate its operational status. The vertical column of lights, preferably from top to bottom as red, amber, and green, may all be either in a dim mode or in a bright mode in which the amber light flashes or may be in any combination of the lights, except the amber light only, and designates the operating condition of the combat vehicle. Some examples are as follows: red light only means the vehicle is armed and off safe; green light only means that weapon system is clear; red and green is the vehicle is prepared to fire but weapon gun is at elevation and not ready for firing; red and amber denote malfunction on main gun; and green and amber means malfunction is cleared.

The rotating thermal beacon is only used during live fire exercises. The rotating amber light is only used on a road march. However, the vertical column of lights are used at all times. Previously, signaling the various operational conditions of the combat vehicles were done by red, yellow and green flags. The nighttime line of passages were signalled by flashlights with various color lenses in which there might be as an example of fourteen flashes of a flashlight to indicate there would be fourteen vehicles returning to the rear from the front line through territory newly occupied by other combat vehicles.

Any combat vehicles in the rear area can see the combat vehicles in the forward area since the vertical columns of lights on the rear of combat vehicles turrets will be switched onto the bright mode and the amber light will automatically be flashing. A dim mode is required since the combat vehicles may need to move to the rear staging area in the passage of lines. If the signaling lights are left full bright it would blind others. When the forward vehicles start moving to the rear area the vehicle will turn 180° and move in the forward gear toward the rear area. The gunner operating the gun turret may however maintain the gun aimed toward the enemy while the combat vehicle moves in the opposite direction, i.e. through other combat vehicles in a passage of lines with the signaling lights still facing to the rear area. As this rearward movement progresses the bright, and especially flashing amber light, would become too bright in the close proximity of the other vehicle operators facing toward the forward area. At this time, an operator must dim the vertical column of signal lights. The amber light will stop flashing in the dim mode.

Figure 2:
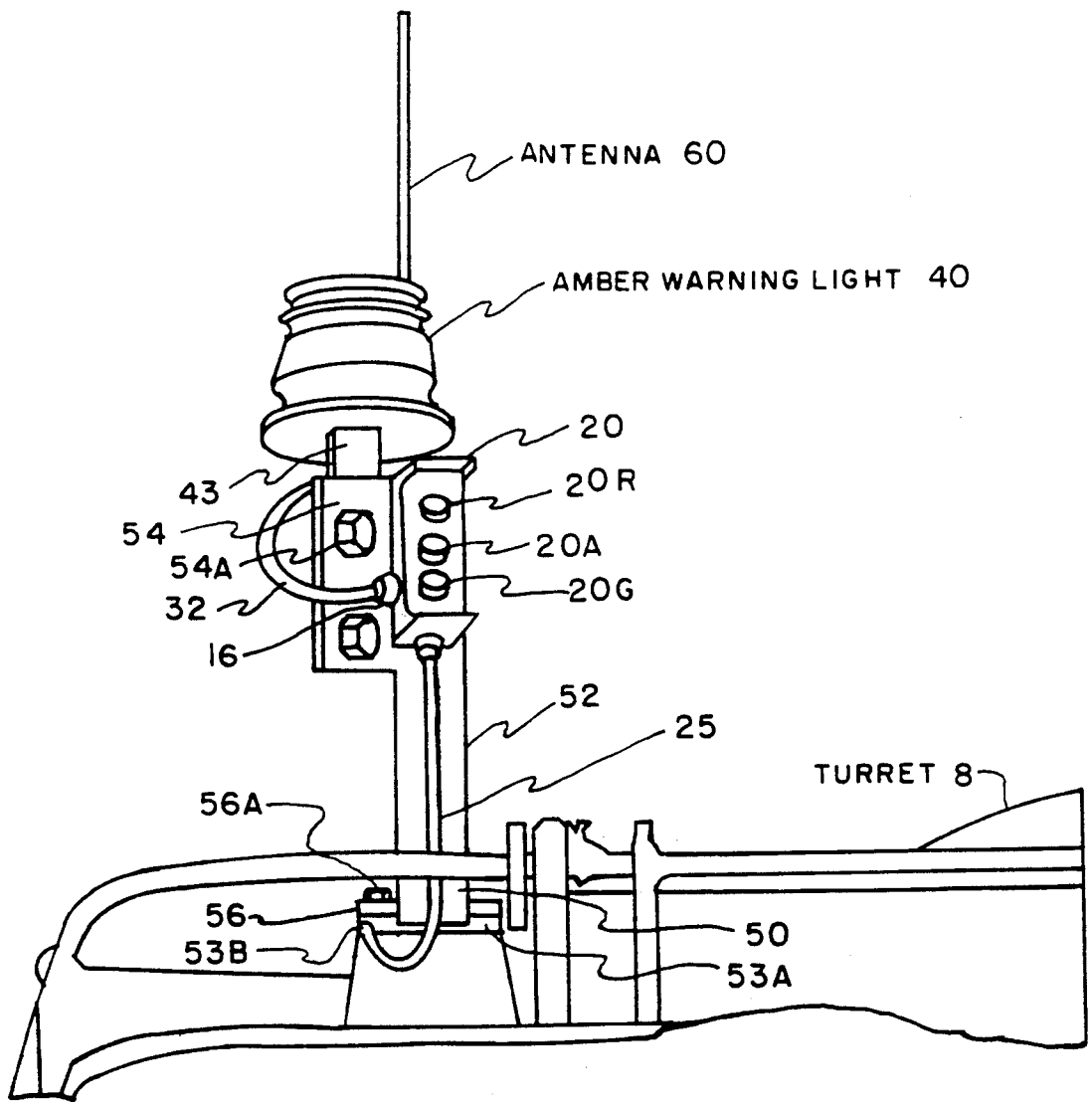
FIG. 2 illustrates another perspective view of the invention including the amber warning light.

Refer now to FIGS. 1 and 2 for a more detailed explanation of the combat vehicle light signaling system mounted on the left rear of a vehicle turret 8 (only partially shown but which covers the pertinent part of the turret 8 needed to explain the invention). An adapter bracket 50, which is preferably 90° L-shaped and flat with the short end designated as a turret mounting plate 53 and the long end designated as a light mounting plate 52, is attached on the exterior of turret 8 to hold a plurality of lights thereon which form the light signaling system. Gusset plate 51 is welded to both 52 and 53 plates where they join to add strength to the adapter bracket 50. Plate 51 is preferably at 45° to each of 52 and 53 and about 5 inches long. The turret mounting plate 53 has a circular flange 53A at its outer most end which is hard connected under an antenna unit mounting flange 56 by existing bolts 56A, which holds antenna tuning unit 58 and antenna 60. Circular flange 53A has an opening 53B therein through which power cable 25 passes between an interior control box 10 (illustrated in FIG. 3 and by electrical schematic in FIG. 4) and an exterior light box 20 (illustrated by electrical schematic in FIG. 4). The turret mounting plate 53 may be constructed differently, for attachment to other vehicles.

Figure 3:
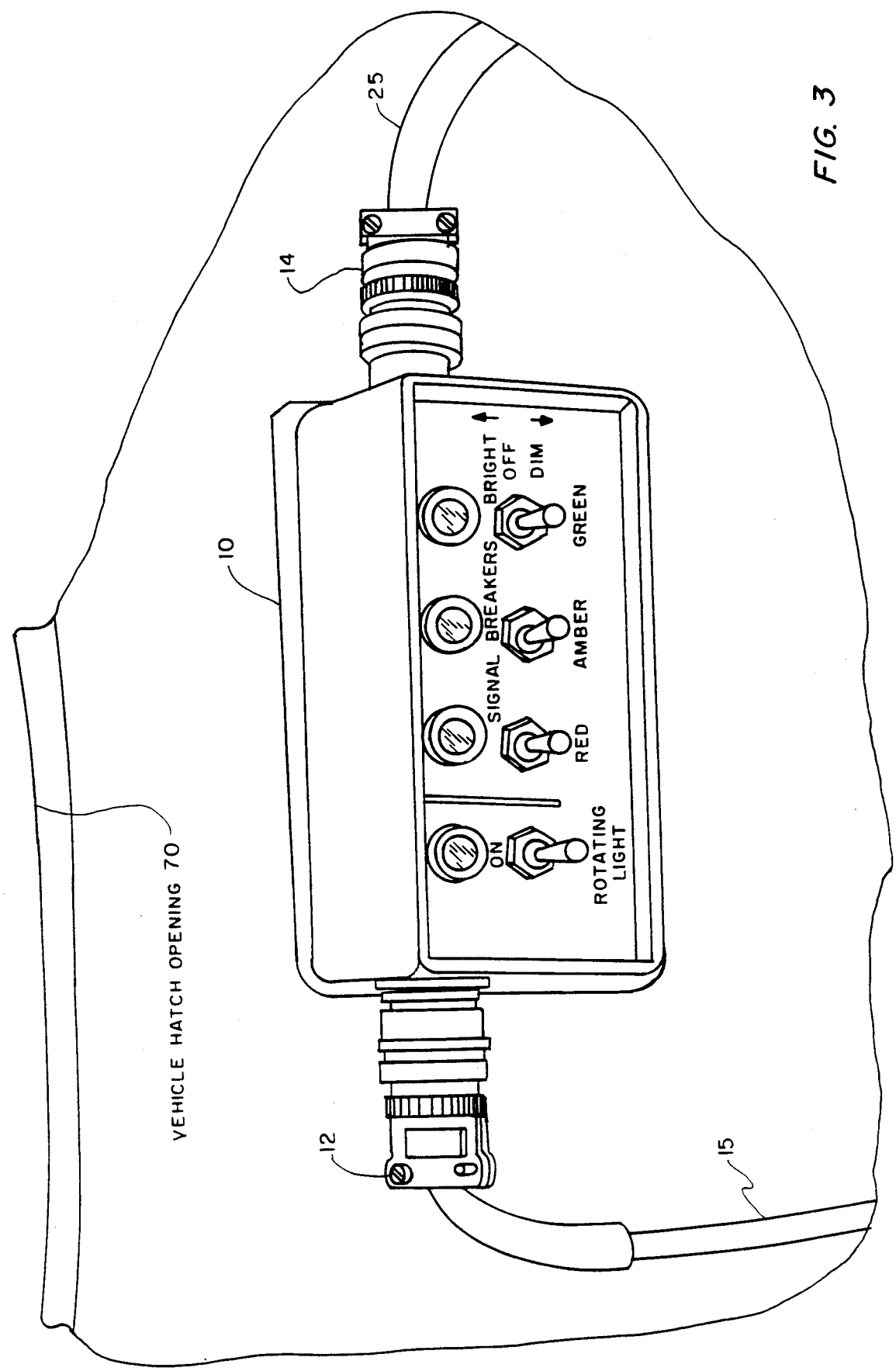
FIG. 3 shows the control box used by an operator to actuate the light signaling system.

The interior control box 10 illustrated in FIG. 3 is preferably attached to an existing communication box plate (not shown) close to the vehicle turret hatch opening 70 convenient for the operator to easily activate the various switches for selectively turning on the exterior lights. The control box 10 has power applied thereto from an internal power source 6, which is typically a 24 DC volt supply, by cable 15 through input power plug 12. An output power plug 14 routes power from source 6 through cable 25 to the exterior light box 20.

The light box 20 is attached to the outermost end of light mounting bracket 52 by same convenient attachment means. Box 20 has on a front cover thereof the vertical column of various color lens, or various color lights. These lights are preferably three lights in the color pattern of a regular traffic light, i.e. red, amber, and green from top to bottom represented respectively by 20R, 20A, and 20G. Preferably the size of these lights are as disclose above, i.e. one inch in diameter at about one inch apart. The light box 20 has a plug connector 16 on the side thereof onto which a matching circular jack at the end of electrical leads 32 may be plugged. These electrical leads 32 may be electrically attached to either the thermal beacon 30 or the amber light 40, if one of these rotatable warning lights is being used. Both lights 30 or 40 are easily mounted and dismounted on an offset flange 54 on plate 52. The thermal beacon 30 is mounted to 54 at a mounting block 33 at the opposite end of a long hollow tube 31. The connection is illustrated by bolts 54A, but may be by other means. The amber warning light 40 is attached to a short support bracket 43. The other end of bracket 43 may be attached to 54 by the same bolts 54A.

Figure 4:
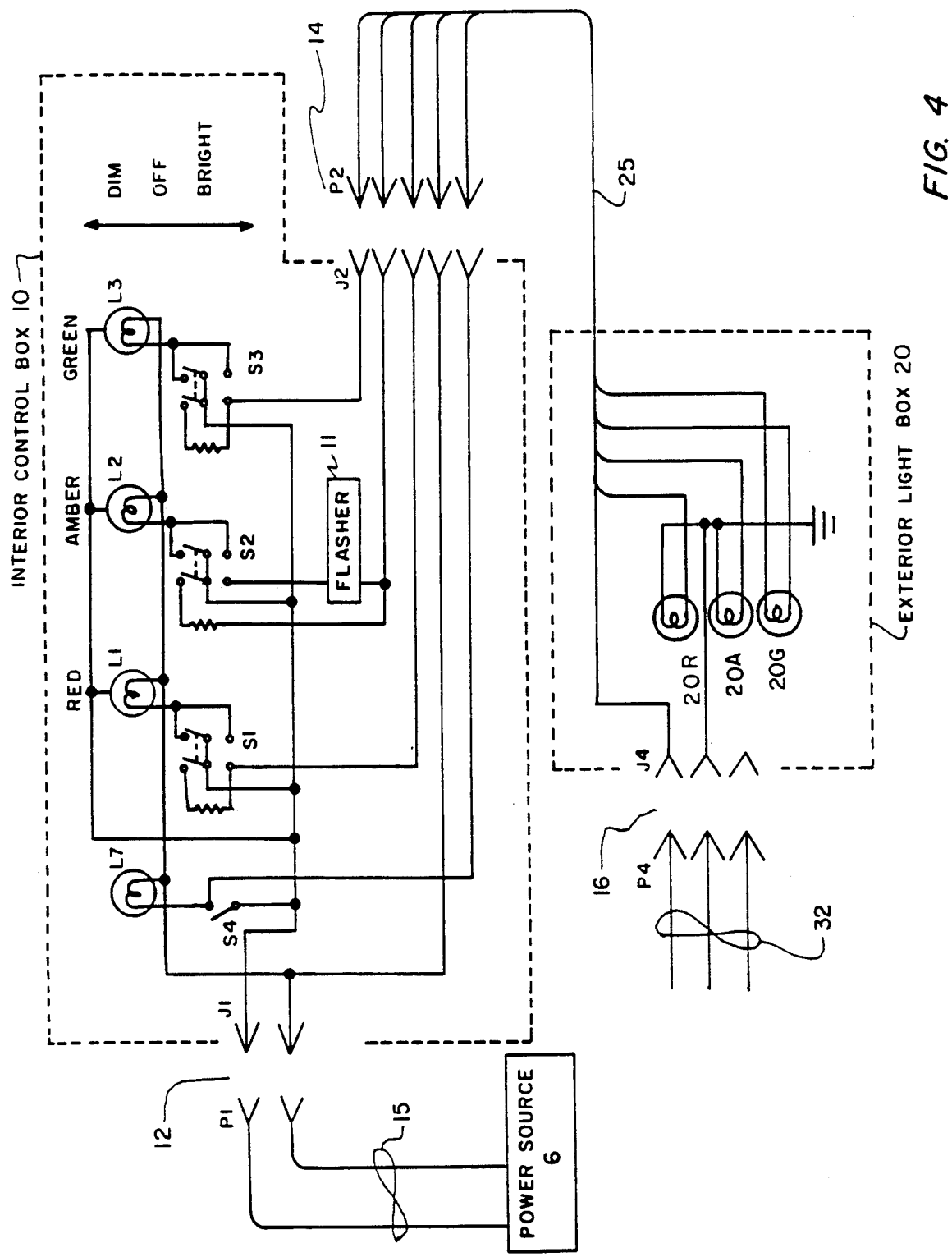
FIG. 4 is an electrical schematic of the light signaling system.

Look more closely to FIGS. 3 and 4 for an explanation of the signaling light controls. The interior control box 10 is comprised of three double-pole, double-throw, three position toggle switches for individually controlling the red, amber, and green exterior lights on 20 and a single-pole, single-throw toggle switch for turning the rotatable warning light 30 or 40 either on or off if one of these lights are attached at input plug 16. Each of the three double-pole, double-throw toggle switches may turn one of the three lights in the vertical column of lights to the bright mode by flipping to one side or to the dim mode by flipping to the other side or off in the middle position. All four of the lights switched on the control box 10 have press-to-test indicators, shown as the signal breakers on the front of 10. Each one of the indicators has a matching color lens, i.e. red, amber, and green and a clear lens for the rotating warning light.

The electrical schematic can now be used to better illustrate how the control box 10 and exterior light box 20 operate. First, assume that all electrical plugs and jacks 12, 14, and 16 are electrically connected from the 24 DC volt power source 6 to each of the red, amber, and green lights of the exterior light box 20, and to the rotatable warning light by cable 32. Further, assume all of the exterior lights are operable as proven by the press-to-test operation. Therefore, only the switching within box 10 control the actuation of the exterior lights. The three double-pole, double-throw toggle switches, represented by switches S1, S2, and S3 are shown in FIG. 4 in the center off position. When either of these switches S1, S2, or S3 are flipped to the dim position there is a voltage drop across the exterior lights 20R, 20A, and 20G respectively since a resistance is now entered in the electrical circuit to the exterior lights. When either of these same switches are flipped to the bright position the resistance is removed and the exterior lights 20R, 20A, and 20G associated with the switch will become bright. Note that the amber light also has a flasher circuit 11 connected to amber light when switched by S2 in the bright position. Indicator lights L1, L2, and L3 will be on when switches S1, S2, and S3 are either in the dim or the bright mode positions. The rotating beacon single-pole, single-throw switch S4 is also shown in the off position. If the rotating light 30 or 40 is desired to be switched on switch S4 may be switched on and the indicator light L7 will be on to verify to the operator that the rotating light is activated.

While the invention has been described and illustrated with reference to a particular adapter bracket attached to the turret of a particular tank combat vehicle, the inventive concept may be used with any combat vehicle having a freely rotatable gun turret by appropriately changing the adapter bracket to attach to the hardware on the vehicle.

We claim:

1. A multipurpose combat vehicle light signaling system for use in identifying the operational status of said vehicle, said system comprised of:
   a plurality of different color signal lights mounted on a mounting means on the exterior of said combat vehicle;
   light control means, inside said vehicle wherein an operator may selectively illuminate each of said plurality of signal lights individually to provide an identifiable pattern indicating the operational status of said combat vehicle; and
   means for attaching rotatable warning light means on said combat vehicle wherein said rotatable warning light means is comprised of interchangable warning lights in which a first warning light is chosen to indicate that said combat vehicle is a live target in a target practice area and a second warning light is chosen to indicate said combat vehicle is on a road march.

2. A light signaling system as set forth in claim 1 wherein said plurality of different color signal lights are mounted in a vertical column on an adapter bracket on the rear exterior of a gun turret of said combat vehicle wherein said plurality of different color signal lights are visible from the rear of said gun turret through a viewing angle of more than 180°.

3. A light signaling system as set forth in claim 2 wherein the vertical column of lights are comprised of three lights mounted on an exterior light box which are arranged as a normal traffic light pattern in which a red light is on top, an amber light is in the middle, and a green light is on the bottom, wherein each light has a circular lens of about one inch in diameter with the separation of each lens of about one-half inch.

4. A light signaling system as set forth in claim 3 wherein said mounting means is a 90° L-shaped adapter bracket having a turret mounting plate on the short end attachable to the left rear exterior of said gun turret and a light mounting plate on the long end for attaching said exterior light box thereto wherein said light mounting plate is further comprised of an offset flange on the upper end thereof for attaching said rotatable light means thereto.

5. A light signaling system as set forth in claim 4 wherein said light control means is comprised of an interior control box having three double-pole, double-throw center-off toggle switches and one single-pole, single-throw toggle switch wherein each of said three double-pole toggle switches separately switch each of said three lights in the vertical column of lights to a dim mode on a first side pole and to a bright mode on a second side pole and said single-pole toggle switch selectively activates said rotatable light means.

6. A light signaling system as set forth in claim 5 wherein the interchangeable warnings lights of said rotatable warning light means is comprised of said first warning light which is an infrared beacon positioned on a hollow tube high above the thermal mass of said vertical column for use in live fire practice and said second warning light which is of amber color is positioned just above said vertical column of lights and is for use in highway travel.

7. A light signaling system as set forth in claim 6 wherein when said double-pole double-throw toggle switch which controls said amber light mounted on the exterior light box is switched to the bright mode on the second side pole, said amber light mounted on the exterior light box automatically flashes.

* * * * *